May 16, 1933.  O. C. SCHULZ  1,909,016
MANUFACTURE OF SURGICAL BANDAGES
Filed Sept. 8, 1928
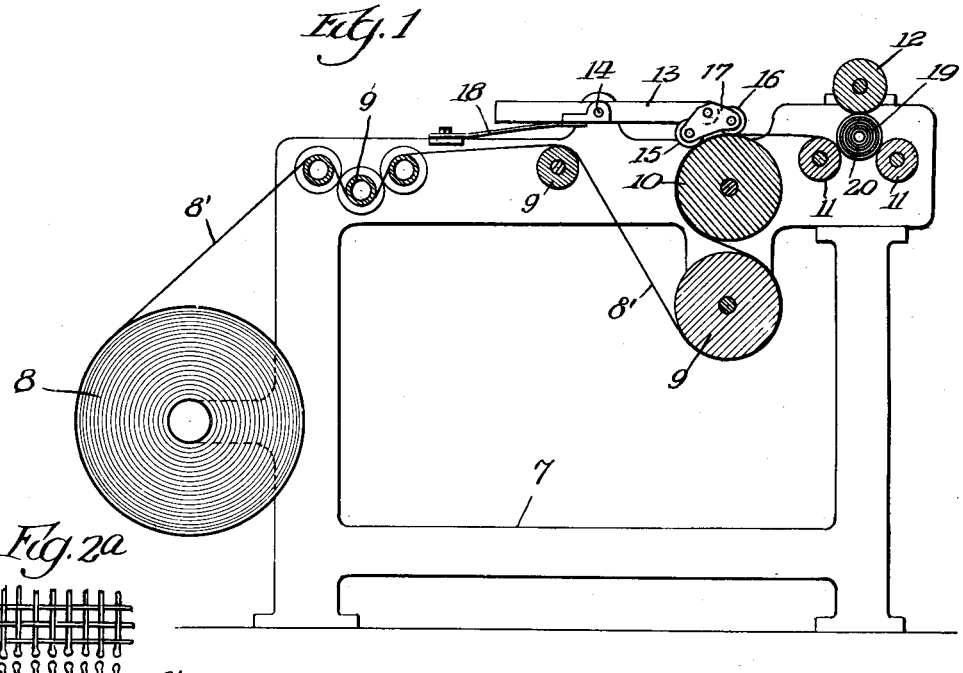
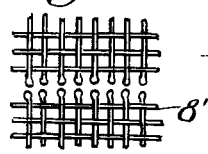
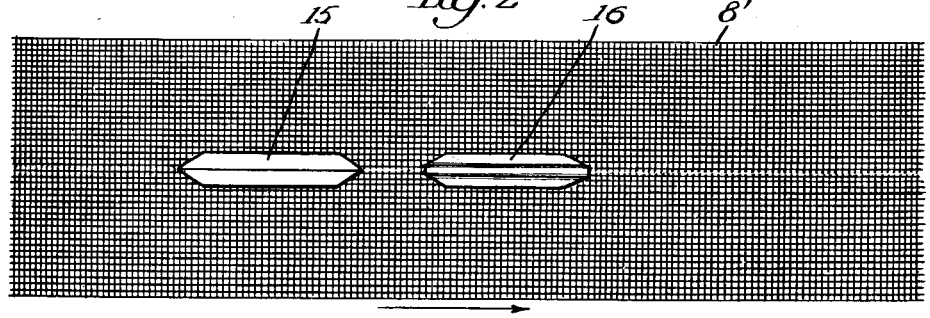
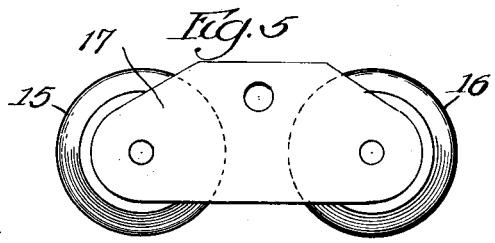
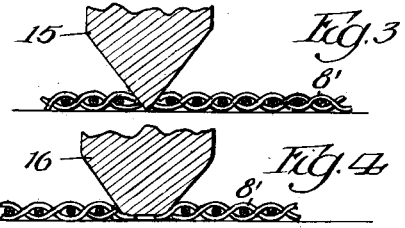
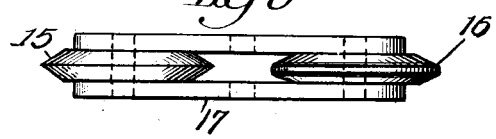
Inventor:
Otto C. Schulz
By Wm O. Belt Atty.

Patented May 16, 1933

1,909,016

UNITED STATES PATENT OFFICE

OTTO C. SCHULZ, OF RIVERSIDE, ILLINOIS, ASSIGNOR TO THE BAY COMPANY, OF BRIDGEPORT, CONNECTICUT, A CORPORATION OF DELAWARE

MANUFACTURE OF SURGICAL BANDAGES

Application filed September 8, 1928. Serial No. 304,825.

This invention relates to the manufacture of surgical bandages and its primary object is to prevent raveling at the edges of the bandage.

The practice is to cut a continuous web of gauze into strips of bandage width and immediately wind the strips into bandage rolls; and my invention has for its object to seal the edges of the lines of cut as the web is cut to prevent the edge warp threads from raveling.

And a further object is to crush the cut edges of the web to seal the edges and prevent the warp threads from raveling, this crushing effect being principally upon the ends of the weft threads and produced immediately after the web is cut.

I have illustrated a machine which may be used in practicing my invention and referring to the drawing Fig. 1 is a sectional elevation of the machine.

Fig. 2 is a plan view of a strip of gauze and the cutting and crushing tools.

Fig. 2A is an enlarged detail view showing the crushed edges.

Fig. 3 is an enlarged detail sectional view showing the operation of the cutter.

Fig. 4 is a similar view showing the operation of the crusher.

Figs. 5 and 6 are enlarged views of the cutting and crushing tool.

In the drawing 7 is a frame of any suitable construction and 8 is a supply roll of surgical gauze supported on the frame. The web 8' of gauze travels from the supply roll through and over tension rollers 9, suitably disposed, and over platen roller 10 to the feed rollers 11 and presser roller 12. A plurality of cutter bars 13 are pivotally mounted at 14 on the frame and they carry the tools which cut the web into strips and seal the edges of the strips. Each tool comprises a rotary cutter 15 and a rotary crusher 16 rotatably mounted in tandem position in a holder 17 which is pivoted on the cutter bar 13 to operatively engage the web on the platen roller. A spring 18 acts on the cutter bar to hold the tool to its work. The cutter has an edge which will effect a severance of the gauze web, it may be sharp but I find it satisfactory to provide a dull edge which will cut the threads by crushing them. This also avoids the necessity of maintaining a sharp edge on the cutter. The crusher has a blunt or relatively very dull edge, and it is shown somewhat exaggerated in Fig. 4. The crusher follows the line of cut of the cutter and crushes the threads at the edges of the cut. To a considerable extent the cutter cuts between two warp threads and the crusher crushes and flattens the ends of the weft threads, Fig. 2A, to hold the edge warp threads and prevent them from raveling. If the line of cut crosses a warp thread the crusher will crush the end portions thereof at and adjacent the line of cut. From the platen roller the cut strips are wound into bandage rolls 19 on a spindle 20 and in the practical use of my invention I have found that the rolls stick together end to end, convenient for quantity handling. The rolls may be easily separated and the ends are soft and smooth and free from ravels. The invention provides an efficient method and means for making bandage rolls from a web of gauze and treating the severed edges to prevent raveling in the roll or in using the bandage. This non-raveling effect is produced without loss of material, without reducing the effective width of the bandage strip, and without any additional operation. I have shown the invention embodied in a machine suitable for the purpose, but I may make any changes in the form, construction and arrangement of parts within the scope of the following claims.

The reason for cutting and crushing the edge of the bandage strips before passage thereof from the platen roller is to insure that the crushing means will engage both the cut edges. The devices must be close together or the edges will separate from each other before engaging the crushing means. The tendency to deviate from a straight line cut, which is an inherent characteristic of gauze, is obviated by juxtaposing the cutting and crushing means, and this is important, for cutting in a straight line will tend to follow the warp of the gauze so as to avoid cutting the warp threads.

I claim:

1. In a machine for making surgical bandages, the combination of means for feeding a web of fabric material through the machine, a pivotally supported holder, and a cutter and a crusher supported in tandem position in the holder to cut the material and crush the cut edges to prevent raveling.

2. In a machine for making surgical bandages, the combination of means for feeding a web of fabric material through the machine, a holder, and a rotary cutter and a rotary crusher supported in tandem position in the holder to cut the material and crush the cut edges to prevent raveling.

OTTO C. SCHULZ.